US007672969B1

(12) United States Patent
Gawdiak et al.

(10) Patent No.: US 7,672,969 B1
(45) Date of Patent: Mar. 2, 2010

(54) CONTEXT BASED CONFIGURATION MANAGEMENT SYSTEM

(75) Inventors: Yuri O. Gawdiak, Silver Spring, MD (US); Mohana M. Gurram, Sunnyvale, CA (US); David A. Maluf, Mountain View, CA (US); Luis A. Mederos, Mountain View, CA (US)

(73) Assignee: The United States of America as represented by the Administrator of the National Aeronautics and Space Administration (NASA), Washington, DC (US)

( * ) Notice: Subject to any disclaimer, the term of this patent is extended or adjusted under 35 U.S.C. 154(b) by 0 days.

(21) Appl. No.: 11/513,429

(22) Filed: Aug. 25, 2006

(51) Int. Cl.
*G06F 7/00* (2006.01)
*G06F 17/00* (2006.01)
*G06F 17/30* (2006.01)
(52) U.S. Cl. .......................................... 707/102; 707/3
(58) Field of Classification Search .................. 707/3, 707/102
See application file for complete search history.

(56) References Cited

U.S. PATENT DOCUMENTS 6,523,027 B1 * 2/2003 Underwood .................. 707/4
6,601,233 B1 * 7/2003 Underwood ................ 717/102
6,609,128 B1 * 8/2003 Underwood ................. 707/10
6,633,878 B1 * 10/2003 Underwood ............... 707/100
6,718,535 B1 * 4/2004 Underwood ................ 717/101
2004/0081951 A1 * 4/2004 Vigue et al. ................ 434/350

OTHER PUBLICATIONS

Gawdiak, et al., Context Based Configuration Management, IEEE 2006 Aerospace Conference, Jul. 24, 2006, 1-8, IEEE Xplore.

* cited by examiner

*Primary Examiner*—Mohammad Ali
*Assistant Examiner*—Alexey Shmatov
(74) *Attorney, Agent, or Firm*—John F. Schipper; Robert M. Padilla

(57) ABSTRACT

A computer-based system for configuring and displaying information on changes in, and present status of, a collection of events associated with a project. Classes of icons for decision events, configurations and feedback mechanisms, and time lines (sequential and/or simultaneous) for related events are displayed. Metadata for each icon in each class is displayed by choosing and activating the corresponding icon. Access control (viewing, reading, writing, editing, deleting, etc.) is optionally imposed for metadata and other displayed information.

8 Claims, 16 Drawing Sheets

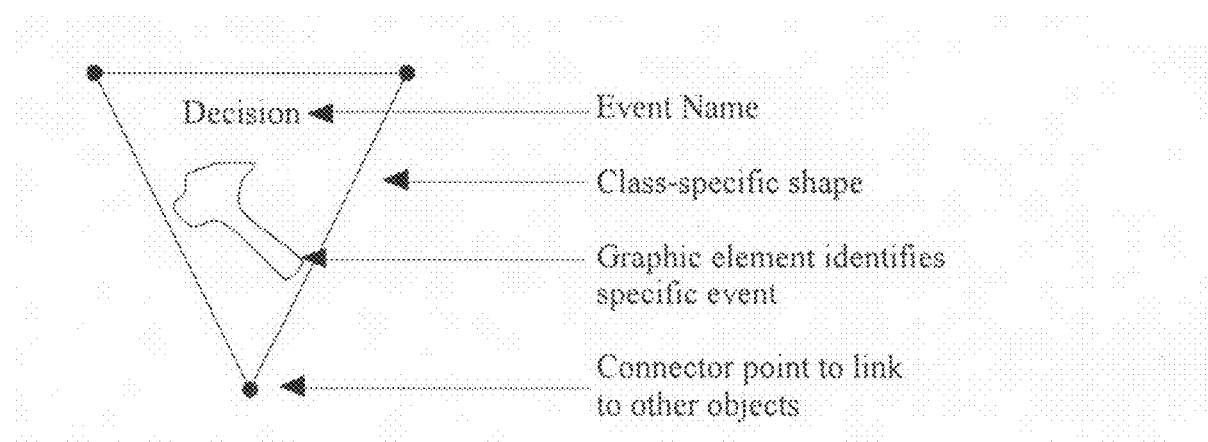
FIG. 3A
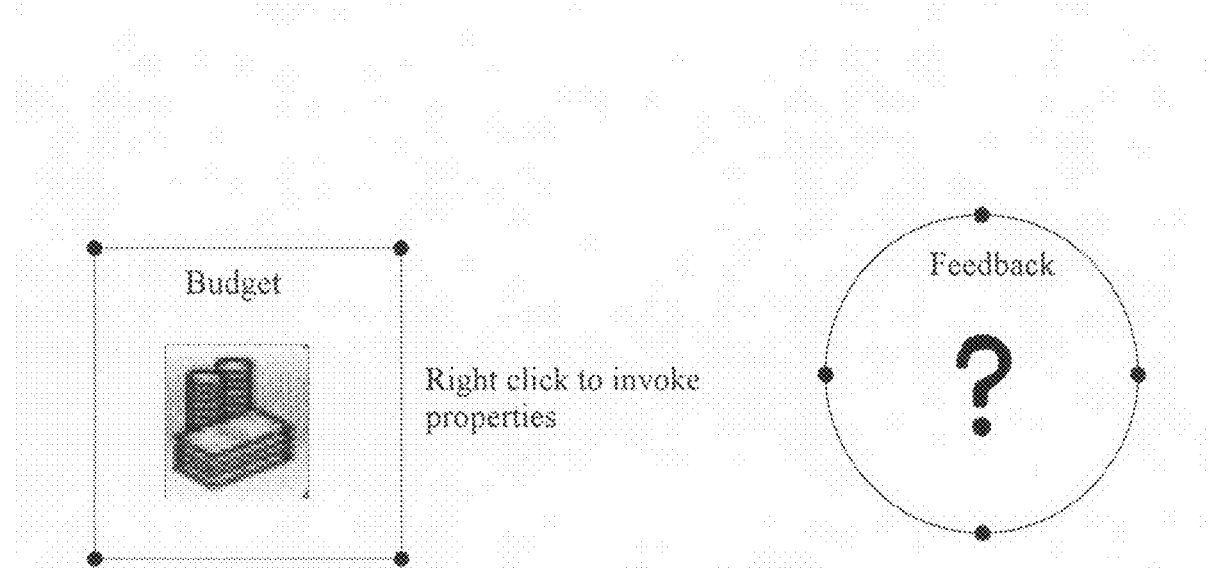
FIG. 3B
FIG. 3C
FIG. 3D
FIG. 3E

| | |
|---|---|
| Object type: EVENT: | \<pull down\> ▼ |

Time of event: 2 pm EDT   5.5.2005

Date created: 5.5.2005   Last modified: 5.23.2005

Summary: [            ↕ ]

Author(s): [            ]

Phone: [      ]   email:: [      ]

Change log:   https://nx.arc.nasa.gov/nx/cbcmView/Collection-1992

User reference links:   [ https://nx.arc.nasa.gov/nx/Collection-1755   ↕ ]

---

Event Location: [            ]

Responsible parties: [            ]

Event rationale, references: [            ]

★ Links to this object     [ Provided by system ]

★ Feedback links & stats   [ Provided by system ]

★ Link statistics: Parents links ___  Child links ___

FIG. 4A

Object type: FEEDBACK    <pull down> ▼

Time of event:  2 pm EDT   5.5.2005

Date created:   5.5.2005   Last modified: 5.23.2005

Summary:

Author(s):

Phone:                    email::

Subscribers:
User
comments,
email address,
links

Configuration Item

Recommended
Actions
rationale

Routing options        <pull down> ▼

Description

FIG. 4B

| | |
|---|---|
| Object type: FEEDBACK: | <pull down> ▼ |

Time of event: 2 pm EDT   5.5.2005

Date created:   5.5.2005   Last modified:   5.23.2005

Summary: [          ↕ ]

Author(s): [               ]

Phone: [        ]     email:: [        ]

Subscribers:
User comments,
email address,
links
[          ↕ ]

---

Feedback target: [          ]

Recommended
Actions, rationale [          ]

Routing options   [ <pull down> ▼ ]

★ Feedback links
& stats   [ Provided by system ]

★ Link statistics: Parents links ___ Child links ___

FIG. 4C decision demonstration fire drill generic lesson(s) learned re-organization review workshop Selections/Procurements Initiation/Deployment Budgets Contracts/Agreements Documents Metrics Organizations Policies Requirements Risks Models/Sim Parameters Sim Results/Predictions Strategy/Plans Values Goals Procedures Roadmaps Milestones/Schedules Estimates Options Mitigations Facilites Personnel Portfolios Notes/Tags Confusion/Questions Beliefs Waste/Inefficiencies Issues/Warnings Disconnects

CONTEXT BASED CONFIGURATION MANAGEMENT SYSTEM

ORIGIN OF THE INVENTION

This invention was made, in part, by one or more employees of the U.S. government. The U.S. government has the right to make, use and/or sell the invention described herein without payment of compensation, including but not limited to payment of royalties.

FIELD OF THE INVENTION

This invention relates to monitoring and visually presenting information, in a decision tree, on a work flow process and status of and change in a document or operation.

BACKGROUND OF THE INVENTION

One problem faced in managing all or part of a large, complex project is determining, at an arbitrary time, the present status of each relevant activity associated with the project and the history of each of these activities. Project activities can be divided into classes, such as decisions, configurations and feedback/communication aspects. For complex projects, it would be helpful if each activity in a class could have an intuitive or self-evident icon or symbol that is clearly associated with that activity.

What is needed is a visually-based system that indicates, preferably using a single intuitive symbol, icon or other indicium, present status of a decision or activity or configuration ("objects"), recent relevant change(s) in the activity statement or the status of, or constraints imposed on, the decision or activity. Preferably, the flexible indicia can be modified to reflect the most important aspects of the activity. Preferably, each (similar) activity should have a distinguishable indicium that is easily recognized by a system user.

SUMMARY OF THE INVENTION

These needs are met by the invention, which provides a visual and textual system, including a set of intuitive icons representing different activities, for indicating status of and/or change in a document or documents and/or in project operations, using the icons to indicate the presence of different classes of changes that have been introduced in the version displayed. In one embodiment, three distinct classes of status/changes are indicated, each class using one of several visually distinguishable icons to indicate the class and providing including additional textual information associated with the icon. Icons from different classes of activities have different shapes, to allow easier distinction between the classes The Context Based Configuration Management (CBCM) system is designed to track changes in, and status of, enterprise level programmatic operations. Enterprise decision making and operations rely on management of non-traditional configuration management (CM) components: estimates, agreements, goals, policies, strategies, plans, values, priorities, options, beliefs, etc. Additionally, enterprise operations have unique environments/contexts: reviews, workshops, firedrills, OMB and Congressional actions, procurements, demos, experiments, etc. The CBCM system will unify off-the-shelf decision history and decision map systems to commercial configuration management systems. Significant knowledge management (KM) enhancements can be made to both the mapping frameworks, as front ends to the CM system, as well adding intelligence to the CM components to improve enterprise level assessments and forecasting. Specific CM objects will be customized to handle both the unique configurable enterprise components as well as the unique enterprise contexts. The KM enhancements focus on collaborative decision/history map development including multi-level independent forward and backward linking between large numbers of independent CBCM systems via the Web. This Web-based inter-activity will allow significant and unobtrusive communications and context enhancements to provide more extensive individual and organizational inputs/comments to a given enterprise strategic decision making activity. Finally, adaptive middleware technologies need to be integrated with the system so that decision/configuration changes can easily inter-operate with a range of enterprise level management systems (portfolio, budget, reporting, scheduling, etc.).

Other related areas of application of the CBCM system include risk management, schedule management, budgeting program/project management and configuration management.

A user interacts with a CBCM system through a graphical user interface, (GUI) with symbols representing different types or classes of decision objects that are placed on parallel time lines and are linked to show inter-dependencies between these objects. Information about a decision object (metadata) is entered and/or displayed by clicking on the corresponding symbol. All information is stored in an object-relational database that can be queried to provide information or to generate a report.

CBCM converts a graphic object, for example, as shown in any of FIGS. 5A-5J, 6A-6V and/or 7A-7F and associated metadata into extended markup language (XML) for storage, export, report generation and other tasks from a database. The database stores an associated time value for the decision object, any connections between decision objects, and all associated metadata.

BRIEF DESCRIPTION OF THE DRAWINGS

FIGS. 3A-3E illustrate icons and icon shapes for different classes of objects used in the invention.

FIGS. 4A, 4B and 4C display metadata associated with the icons in FIGS. 3A, 3B and 3C, respectively.

DESCRIPTION OF BEST MODES OF THE INVENTION

Figure 1:
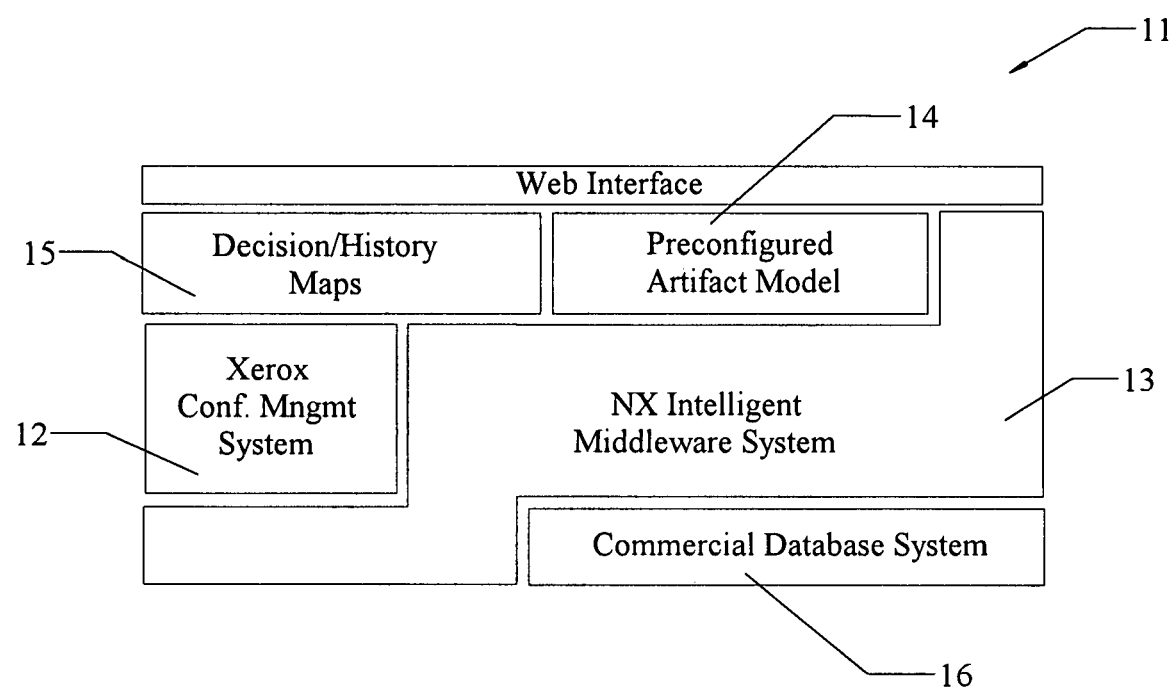
FIG. 1 schematically illustrates a system architecture according to one embodiment of the invention.

FIG. 1 schematically illustrates architecture of a context based configuration management (CBCM) system 11, including: a configuration management (CM) sub-system 12 for standard CM workflow capabilities; an intelligent middleware (IM) sub-system 13 for standard documentation management; a library 14 of preconfigured artifact models and flexible interfaces; a decision history and map sub-system 15, used to capture and archive the full context for a decision environment; and a database sub-system 16 providing multidimensional databases. The CM and IM sub-systems preferably rely upon an NX system, developed earlier by some of the inventors and issued as U.S. Pat. No. 6,968,338. The configuration management system 12 includes relevant information on the history to date of changes in one or more of the maps, the change-initiator, etc., for each preceding version of a map.

Figure 2A:
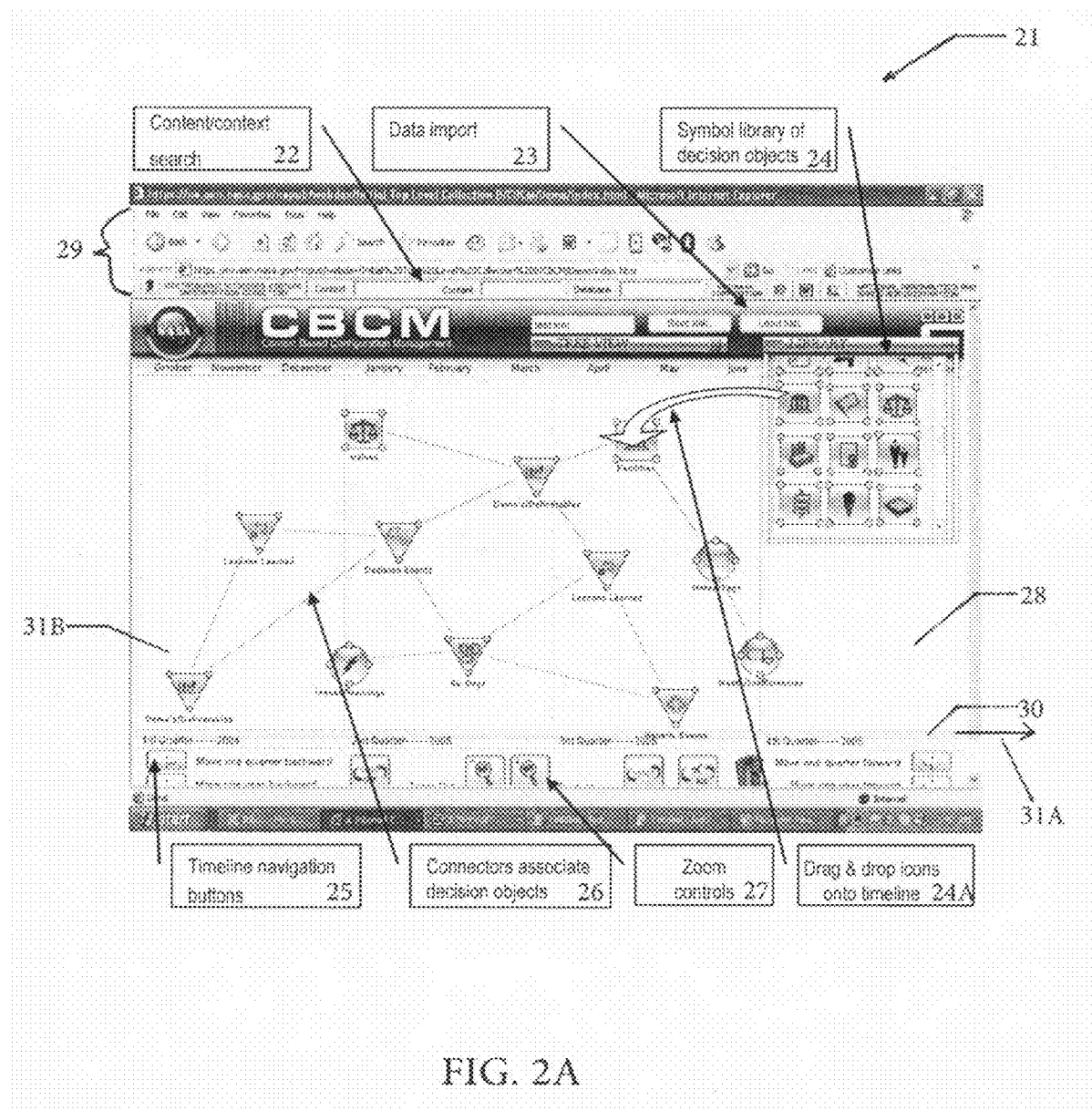
FIGS. 2A-2B illustrate one embodiment of a CBCM GUI with an exemplary symbol library (FIG. 2A).

FIG. 2A illustrates one embodiment of a graphical user interface (GUI) 11, showing some of the key features that can be used to practice the invention. These features include specification of a context-based or content-based search 22, specification of data to be imported 23, a (first layer) symbol library for decision objects 24 (available for drag/drop onto a user-defined time line 24A), a time line increment navigation control 25, a connector line segment or curve to associate two or more decision objects 26, an image zoom control 27, a general display area 28 for the symbols explicitly shown, and a menu of generic computer operations 29. A time line 30 having a first dimension 31A is set forth in a first (horizontal) direction on the display area 28. A second dimension 31B of the time line is defined in a second direction (e.g., approximately vertical) that is laterally oriented relative to the first direction in the display area 28. Where two or more decision objects are associated with each other, as where a first decision object must precede or occur at the same time as a second decision object, a line or connector is provided connecting these two or more decision objects, and these decision objects are said to "have a time relationship to each other." Optionally, a vertically oriented connector indicates simultaneous occurrence; and a lateral, but not vertical, connector orientation indicates that the first decision object precedes the second decision object, as illustrated in FIG. 2A.

One or more icons can be added to, removed from, or merged with, another icon shown in the symbol library. This includes the icons from the classes of event objects, configuration objects and feedback/communication objects, shown in FIGS. 3A, 3B and 3C, respectively. Each of the icon classes is indicated on the screen in FIG. 2A by a distinguishable geometric shape, such as the triangle, quadrilateral and oval used for the icons in the classes shown in FIGS. 3A, 3B and 3C. The particular shapes used are not critical, as long as the shapes are distinguishable for each class. For example, a shape combining linear and curvilinear segments, such as the "sunrise" shape and the curvilinear trapezoid shown in FIGS. 3D and 3E, could also be used here.

The decision event icon, shown in FIG. 3A, preferably includes the event name, a mnemonic graphic element identifying the specific event, a connector region, used to link an icon to other icons, and the characteristic icon shape. The configuration icon, shown in FIG. 3B, includes the configuration name, a mnemonic graphic element identifying the specific configuration, a connector region and the characteristic icon shape. The feedback or communication icon, shown in FIG. 3C, includes the feedback mechanism name, a mnemonic graphic element, a connector region and the characteristic icon shape. Other relevant information can be included in an icon, as needed.

Icons from different classes may be introduced onto the screen 28 in FIG. 2A, where, for example, icons from the decision events class (FIGS. 5A-5J) and from the configurations format (FIGS. 6A-6V) appear on the same screen.

A CBCM system is opened via a URL in a Web browser. Each CBCM decision map is stored as a document within a file system. To activate a decision process within the system, a user drags one or more icons from the symbol library to an appropriate time frame in the display and optionally provides one or more time line connections to this icon. Two or more decision objects are connected or linked by left clicking on the icon connector region and dragging a first object icon to contact a second object icon connector region on a screen. A right mouse click causes a pop-up in properties that can be used to activate or display additional information about the chosen decision object. Control buttons (e.g., 25, 27) located at the bottom of the GUI allow time line navigation, zoom, pan and other operations in the large.

Optionally, the GUI provided by the invention works with a first (overview) screen layer, shown in FIG. 2A, and a second (menu) screen layer, with one layer being presented at a time. FIGS. 4A, 4B and 4C illustrate menu layers for the decision events class, the configuration class and the feedback mechanism class that are illustrated in more detail in the respective FIGS. 5A-5J, 6A-6V and 7A-7F, discussed in the following. Within a given class, all menu formats are the same, although the metadata that appears in each entry of a menu may be different from one icon to another within that class.

FIG. 4A illustrates a decision event metadata display, which is brought up on a screen by left clicking and holding a selected icon from the class of icons shown in FIGS. 5A-5J. All decision event icons have a characteristic triangular shape, as shown in FIG. 3A. The decision event metadata includes: object type or class (here, decision event); the event time and date; time and date the icon was created and was last modified; icon author(s); phone number and e-mail address for contact of one or more of icon author(s); a change log for the icon and the associated information change; one or more user reference links; location(s) of the event; persons responsible for the decision; rationale references for this event; links from elsewhere to this object; feedback links; and link statistics.

FIG. 4B illustrates a configuration metadata display, which includes object type or class, time and date of creation and of last modification of configuration; summary of config.; config. author(s); phone number and e-mail address for contact of one or more of the authors; subscribers; user's comments on config.; recommended action on config. and rationale; options for routing a config.; description of present version of the config.;

FIG. 4C illustrates a feedback mechanism and communication metadata display, which includes object type or class; time and date of event; date and time the feedback event icon was created and was last modified; icon author(s); phone number and e-mail address for contact of one or more authors; subscribers; user comments; feedback target(s); recommended feedback actions and rationales; options for routing a feedback communication; feedback links and link statistics; and parent and child links.

Figure 2B:
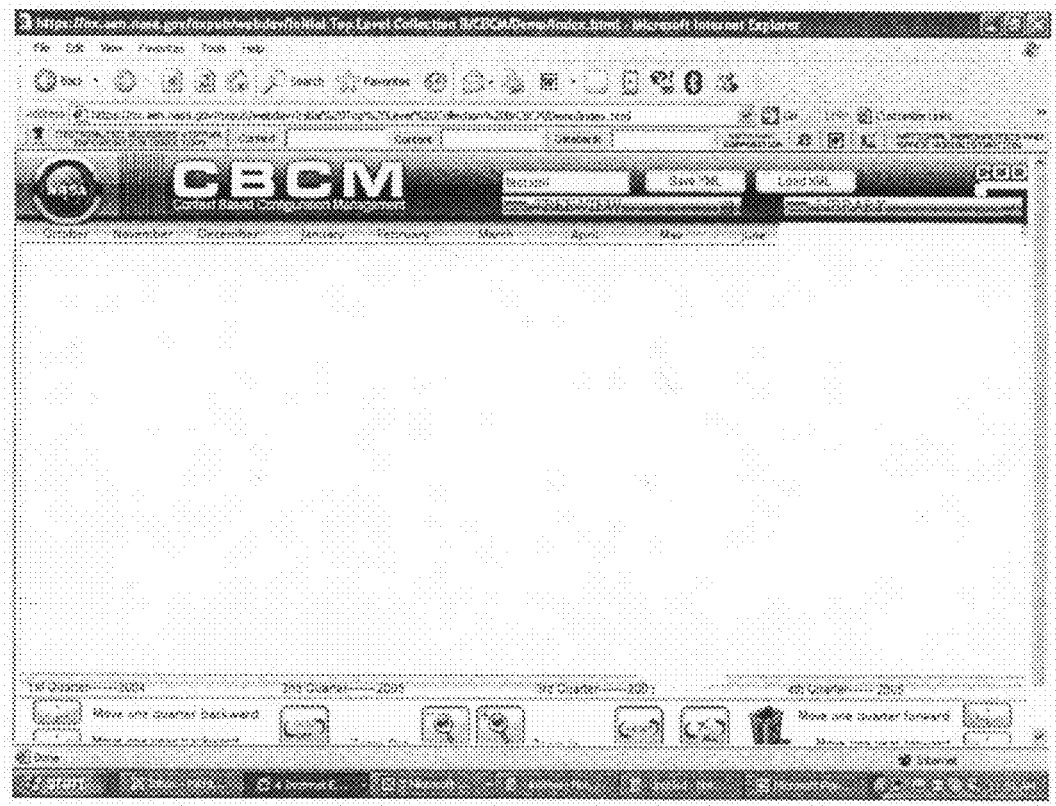
Figure 9:
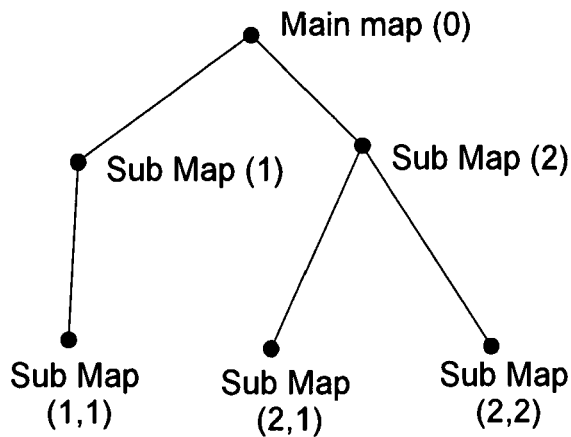
FIG. 9 illustrates map embedding, with three levels of object association.

The system also provides one or more sub-map layers, as indicated in FIG. 9, that provide additional properties or user-entered information. A sub-map layer icon 24S is part of the icon library 24 in FIG. 2A and can be activated by dragging and dropping the sub-map layer icon onto the display screen in FIG. 2A. This will bring up a blank display screen, illustrated in FIG. 2B, that resembles the screen in FIG. 2A. The user then creates icons and other symbols representing information on the screen in FIG. 2B, in one or more sub-map layers.

Optionally, one or more of the icon menu layers has access control associated therewith that restricts access through the usual permissions (view, read, write, delete, edit, etc.), based upon the user's authenticated identity. For example, the menu layer of the "Re-Orgs" icon may be available for viewing by any user, but a second menu layer, such as "Demonstrations," may not allow viewing without presentation of access permission by the user.

Figure 5A:
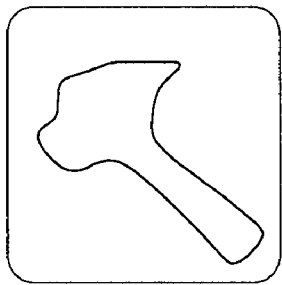
FIGS. 5A-5J are a sample set of 8 symbols used to refer to events in the GUI in FIG. 1.

FIGS. 5A-5J illustrate N1($\geq$2) of the decision events (actions that occur at a specific point in time), with N1=10 here. With reference to FIG. 5A, a "decision" can be a formal, explicit and final decision on an issue. Alternatively, the decision can be implicit or expected, one that has not yet been finalized but already has produced an impact on one or more activities of the organization. Optionally, real and apparent (not yet explicitly implemented) decisions can be captured here.

Figure 5B:
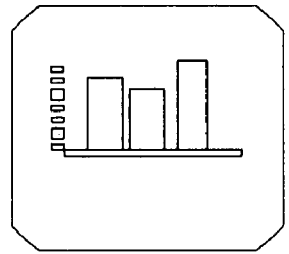

With reference to FIG. 5B, a "demonstration" is normally a significant event, such as a test flight, demo. of a new system, etc. that is intended ti illustrate the capabilities of a major program or project. A demonstration may a precursor to one or more new decisions to be made, based on the success or failure of the demonstration.

Figure 5C:
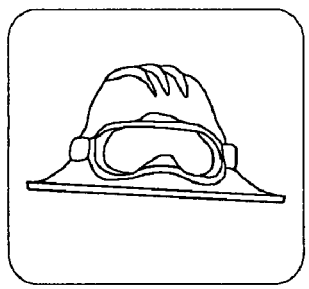

With reference to FIG. 5C, a "fire drill" is typically an unplanned and time-constrained activity that results from an unexpected decision or event. A fire drill may be captured as an exception to a planned activity and may have major consequences.

Figure 5D:
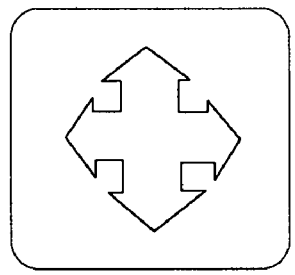

With reference to FIG. 5D, a "generic" decision object is left uncharacterized at this time.

Figure 5E:
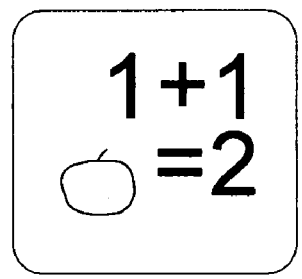

With reference to FIG. 5E, a "lesson learned" represents the outcome(s) of an activity, for example, the CAIB Report on investigation of the circumstances surrounding the Columbia Space Shuttle disaster. A lesson learned may be captured in a specific report or set of data and may heavily influence one or more subsequent decisions.

Figure 5F:
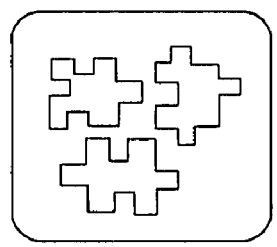

With reference to FIG. 5F, a "re-organization" is a change to an organizational structure and may be planned or unplanned.

Figure 5G:
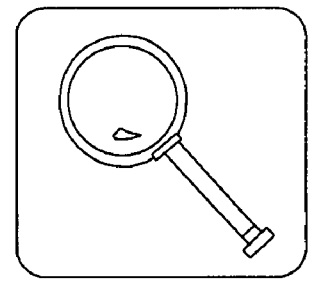

With reference to FIG. 5G, a "review" typically precedes one or more decisions that generate a new activity or one or more changes to a plan or a re-organization. A review is typically a precursor to a decision and may generate one or more subsequent reviews.

Figure 5H:
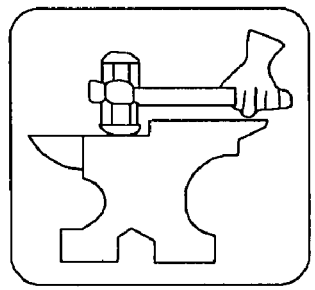

With reference to FIG. 5H, a "workshop" is an activity or event performed to integrate an inter-disciplinary team to achieve a specific, short-term objective, for example, generating a new proposal.

Figure 5I:
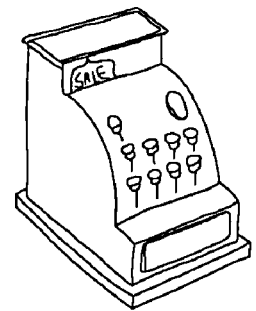

With reference to FIG. 5I, a "selection" or "procurement" is an event, such as a request for a bid or quote or proposed design based on specifications supplied by a requester, and/or a selection of one or more successful bidders or designers for a project.

Figure 5J:
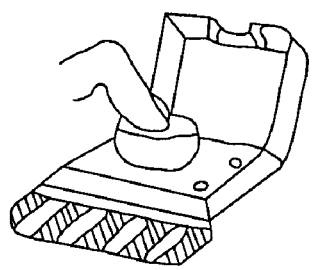

With reference to FIG. 5J, an "initiation" or "deployment" is an initial use of a design or technology or procedure that has been accepted, with a view to testing of, or field use of, the design or technology or procedure.

Information concerning an event (metadata) is captured and stored in a database and is accessible through specified search or report queries. An event property is entered by a user and may include one or more of the following fields: characterization of the event; leader or coordinator; leader affiliation; date of event; point of contact for event; consequences, if any, of event.

Figure 6A:
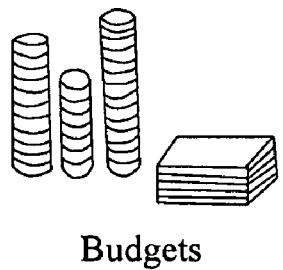
FIGS. 6A-6V are a sample set of 11 decision object configuration or format symbols that may be used in a second layer of a FIG. 2A decision.
Figure 6B:
Figure 6C:
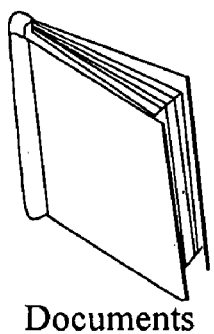
Figure 6D:
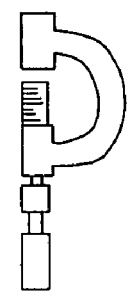
Figure 6E:
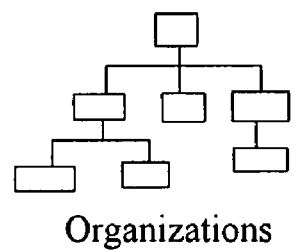
Figure 6F:
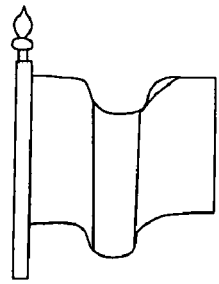
Figure 6G:
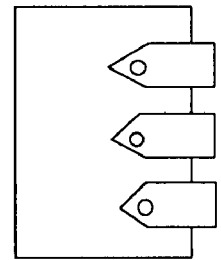
Figure 6H:
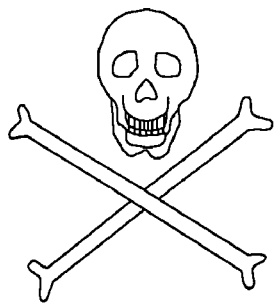
Figure 6I:
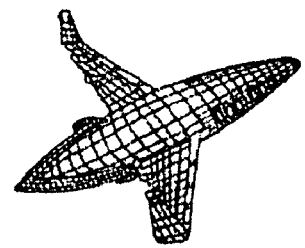
Figure 6J:
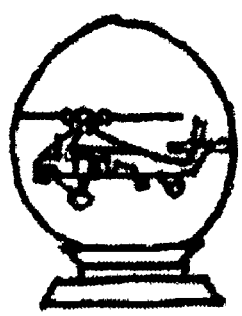
Figure 6K:
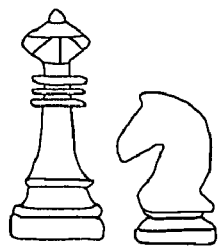
Figure 6L:
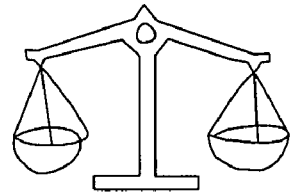
Figure 6M:
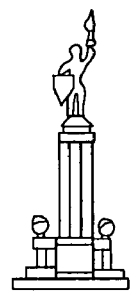
Figure 6N:
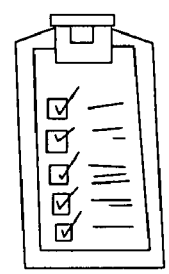
Figure 6O:
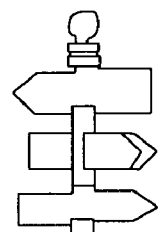
Figure 6P:
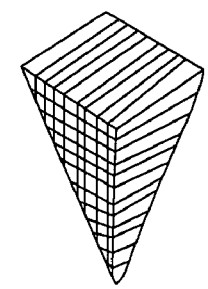
Figure 6Q:
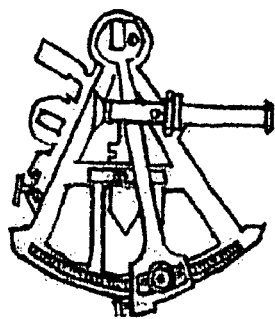
Figure 6R:
Figure 6S:
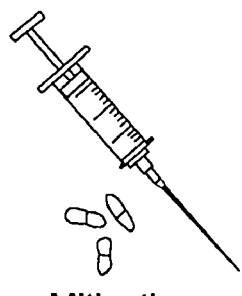
Figure 6T:
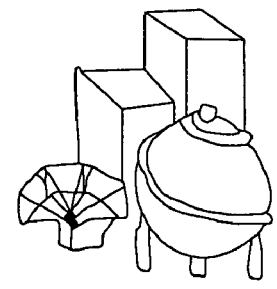
Figure 6U:
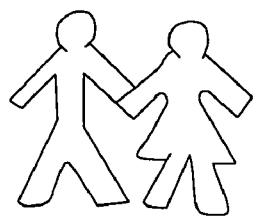
Figure 6V:
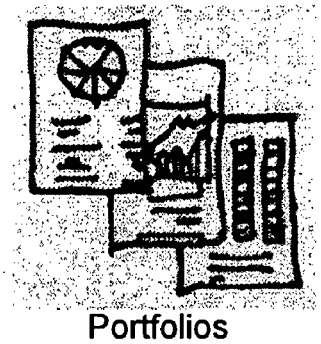

FIGS. 6A-6V illustrate N2($\geq$2) configurations or formats for decision object, which are tracked for status, with N1=22 here. With reference to FIG. 6A, a "budget" concerns funding available for a particular program for a particular time interval.

With reference to FIG. 6B, an "agreement" or "contract" is a formal/informal agreement between two or more entities that defines the terms and conditions for qualification, performance and/or performance mode(s), including delivery of work product.

With reference to FIG. 6C, a "document" (real or virtual) contains or presents information relevant to a decision or activity. The document can be physical (e.g., captured on paper or another tangible medium), or electronic and can refer to other forms of information available within the system.

With reference to FIG. 6D, a "metric" is a quantitative measurement applied to a specific objective, program or other activity. Often, a metric is associated with a scale or other mechanism for comparison with other similar measurements.

With reference to FIG. 6E, an "organization" refers to a combination of human resources associated with a program or activity. An organization can be hierarchical, matrix or virtual, among other characteristics.

With reference to FIG. 6F, a "policy" defines which rules apply to a particular decision or activity. As an example, a policy may have substantial impact on budget allocations for a particular program.

With reference to FIG. 6G, a "requirement" can be explicit (documented) or implicit (informal) and is applied to one or more associated activities.

With reference to FIG. 6H, a "risk" may be anything having potential negative impact on an activity or program. A risk may be standard, expected, or unusual (unique to a particular activity or program).

With reference to FIG. 6I, a "model or simulation parameter" is a relevant parameter used in achieving a simulation result that may appear as data in a simulation result of FIG. 6J.

With reference to FIG. 6J, a "simulation result" is data, generated in other than an actual setting, that can be used to predict a probable future outcome of an activity or program.

With reference to FIG. 6K, a "strategy or plan" is a formal document used to plan and manage and evaluate a program or activity. Alternatively, the strategy or plan can be verbal or virtual.

With reference to FIG. 6L, a "value" is a subjective definition or metric that provides a guide to treatment of one or more persons involved with a program or activity.

With reference to FIG. 6M, a "goal" is an aim or purpose, to be formally achieved, as evaluated by one or more metrics (FIG. 4D).

With reference to FIG. 6N, a "procedure" is a reasonably detailed sequence of steps or processes that can be used to achieve (part of) a goal.

With reference to FIG. 6O, a "roadmap" is an array of major steps or processes, together with one or more metrics, to be used to evaluate how far a project has developed at a particular time.

With reference to FIG. 6P, a "milestone" or "schedule" is an array or timeline containing one or more date/time combinations at which a selected fraction of a project is expected to be completed. A milestone may include one or more metrics (FIG. 6D).

With reference to FIG. 6Q, an "estimate" provides an estimate of time schedule and/or cost and/or performance measure for a project.

With reference to FIG. 6R, an "option" includes at least one alternative approach to implementing one or more of the procedural steps of FIG. 6N.

With reference to FIG. 6S, a "mitigation" is an alternative or additional procedural step that may be taken to lessen the impact(s) or the cost(s) or the scheduling constraint(s) associated with a project.

With reference to FIG. 6T, "facilities" refers to equipment, tools, real estate and related physical, non-personnel assets available to be used, or allocated, for a project.

With reference to FIG. 6U, "personnel" refers to specific persons, and associated talents, to be used for a project.

With reference to FIG. 6V, "portfolios" refers to non-physical and non-personnel assets available to be used for a project.

A mission statement for an organization or program will typically set forth values intended to govern or modify behavior of one or more persons in an organization.

FIGS. 7A-7F are N3 descriptors, with N3=6 here, which provide mechanisms for feedback or connections to decisions and decision processes. A user can link a note or question or belief/assumption to a decision or a configuration item to amplify a discussion on a risk, a constraint, a major disconnect or another problem not adequately discussed or characterized in a decision map. This feedback can be anonymous or can be attributed.

Figure 7A:
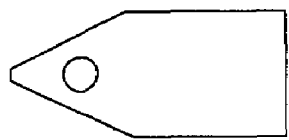
FIGS. 7A-7F are a sample set of decision object feedback and communication descriptors useful in providing feedback.

With reference to FIG. 7A, a "note" or "tag" may be a text note or a document or a URL connected (linked) to a particular decision object.

Figure 7B:

With reference to FIG. 7B, a "question" can be attached to any decision object and may refer to confusion or one or more unresolved issues.

Figure 7C:
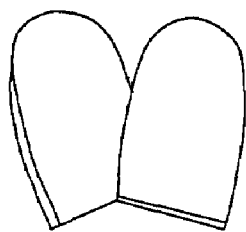

With reference to FIG. 7C, a "belief" can refer to a policy or an assumption (implicit or explicit) that is built into an approach for a project.

Figure 7D:
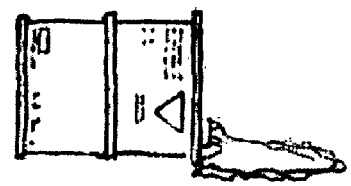

With reference to FIG. 7D, "waste" refers to or identifies cost or risk or constraints, believed to be unnecessary and associated with any activity or program.

Figure 7E:
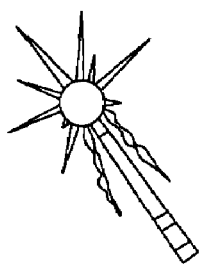

With reference to FIG. 7E, an "issue/warning" refers to an unresolved, or not fully recognized, issue associated with an approach to a project, or to one or more warnings or cautionary notes concerning an approach to a project.

Figure 7F:

With reference to FIG. 7F, a "disconnect" is an inconsistent or incomplete feature associated with an approach to a project.

Figure 8:
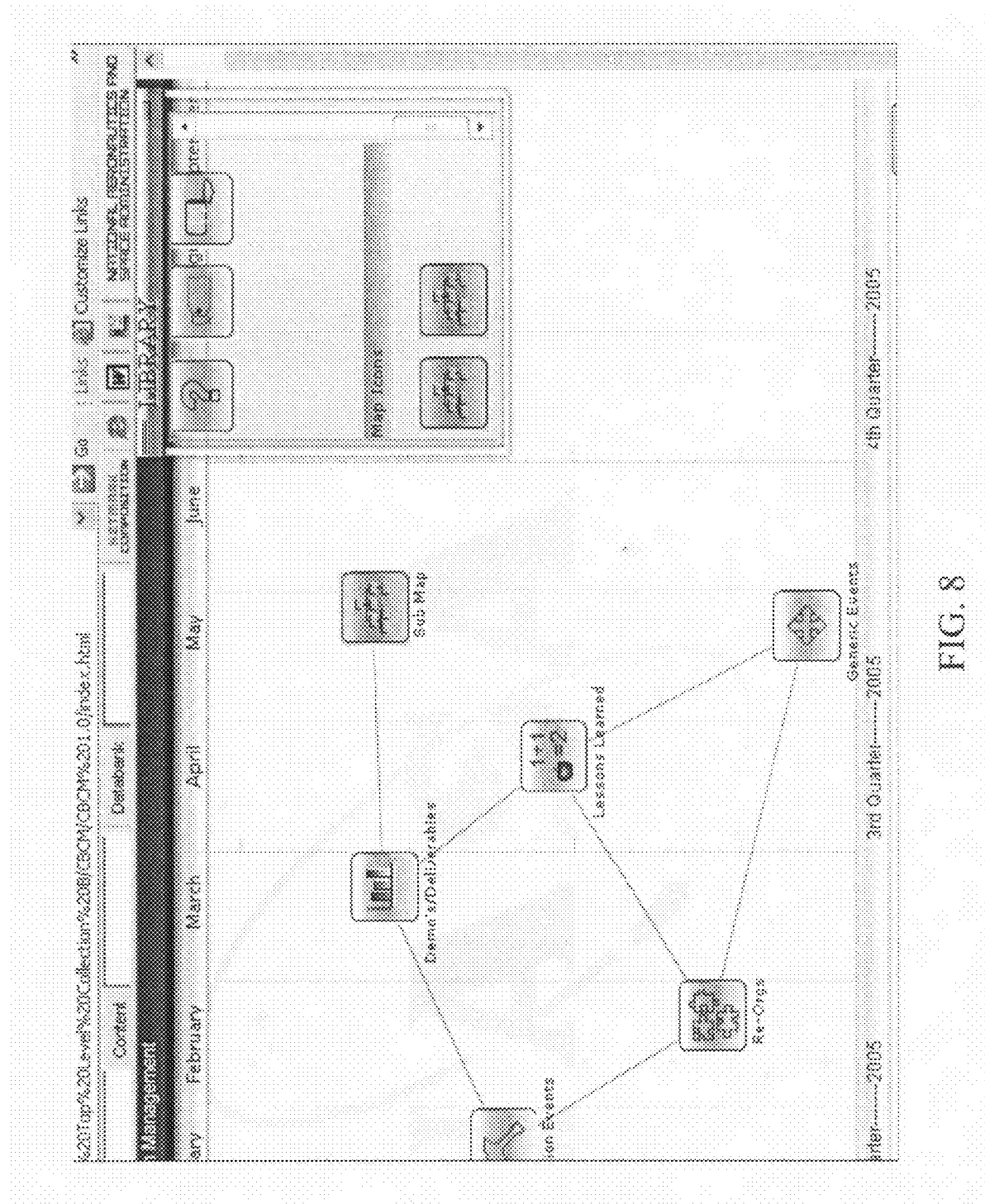
FIG. 8 illustrates establishment of connections between a set of six objects.

A graphical connector between two or more objects represents an association or dependency. In most or all instances, a connection between a first object and a second object that is positioned above and/or to the right of the first object on the screen indicates that information that is made available by the first object (e.g., as an output) is received by and used by the second object. A connector is created by dragging a mouse from the center of the first object to a center of the second object; the connection indicates that information usually flows toward the right and/or toward the top, although two-way communication is permitted. FIG. 8 illustrates creation of a particular set of connections between six objects.

A single decision map can be embedded within another decision map, usually in a hierarchical manner. No limit is imposed on the number of levels of maps that can be created by this process. A sub-map (embedded in another map) is preferably shown with a contrasting color and/or texture from the "parent" map.

FIG. 9 illustrates an example with three levels of sub-layer embedding. The map proceeds from a root node ("Main map (0)") to two first level sub-maps, (1) and (2). The first level sub-map (1) is connected to a second level sub-map (1,1); and the second first level sub-map (2) is connected to first and second, second level sub-maps, (2,1) and (2,2). Additional second level and lower level sub-maps can be included and connected, if needed. The configuration in FIG. 9 may represent an inquiry, in which the root node is an initial activity or event and the lower level sub-maps correspond to subsequent events and/or subsidiary descriptors that are interpreted in a context associated with the root node. Access control and security are optionally imposed on viewing, reading writing, editing, deleting, etc. for each level of sub-layer maps.

Figure 10:
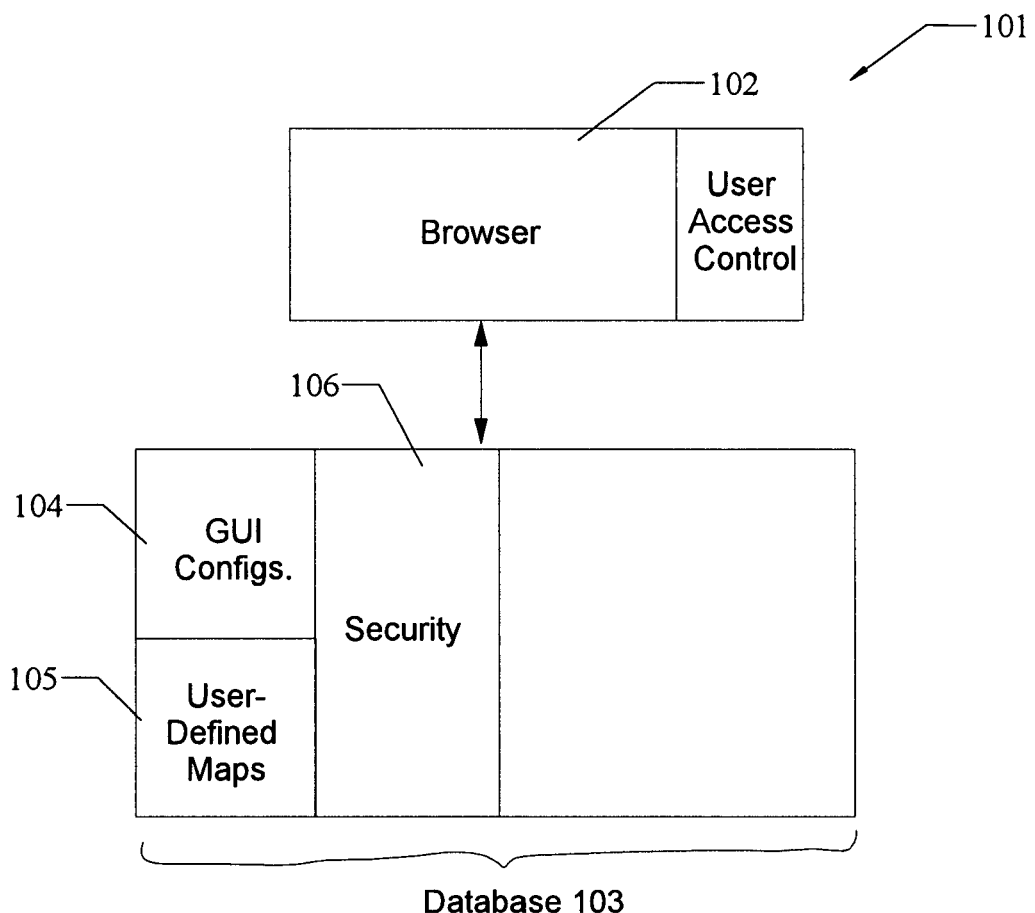
FIG. 10 schematically illustrates operation of the system according to one embodiment.

FIG. 10 schematically illustrates operation of one embodiment of the system 101. The user is presented with a browser 102, which optionally uses either flash or Javascript to translate user requests into commands that are received by a database 103. The database 103 may rely upon any of several context-based and/or content-based query systems, such as NX, Netmark, etc. and upon http basic commands (get, put, post, etc.). The database 10 presents and allows manipulation of various GUI configurations and features 104, such as icons, fields, field types, variable types, etc., and presents and allows manipulation of user-defined maps 105, such as the map presented in FIG. 2A.

Security and access control, if activated, are implemented first at the browser level, which requires presentation of an authenticated user identity (password, biometric indicium, signature, etc.). The authenticated user identity is then received by a security module 106, associated with the database 103, which analyzes the user identity and sets appropriate access controls and permissions associated with the user maps (FIGS. 2A, 2B), with decision events (FIGS. 5A-5J), with formats for decision objects (FIGS. 6A-6V), with decision object descriptors (FIGS. 7A-7F), and with the associated under-layers for the different icons.

What is claimed is:

1. A method for configuring and displaying information on changes in, and present status of, a collection of events associated with a project, the method comprising programming a computer:

to provide and display a first collection of N1 visually perceptible and distinguishable event icons representing N1 different activities, numbered n1=1, ..., N1 (N1≧2), associated with the project, where the first collection comprises N1 icons from a group including: a first icon representing a decision made or to be made, concerning the project; a second icon representing a demonstration associated with the project; a third icon representing a fire drill activity associated with the project; a fourth icon representing a generic activity associated with the project; a fifth icon representing at least one "lesson learned" that is associated with the project; a sixth icon representing a reorganization activity associated with the project; a seventh icon representing a review activity associated with the project; an eighth icon representing a workshop activity associated with the project; a ninth icon representing a procurement/selection activity associated with the project; and a tenth icon representing initiation or deployment of at least a portion of the project;

to provide a time line, having at least a first dimension and a second laterally oriented dimension, and associating first and second event icons, with selected time values, $t=t_{L1}$ and $t=t_{L2}$, respectively, along the time line, with $t_{L1} \leqq t_{L2}$;

to provide a connector line, oriented lateral to the first dimension, connecting the first and second event icons, when the first and second event icons have a time relationship relative to each other;

to provide a visually perceptible display of the time line and of the first and second decision icons and the connector line at a selected location along the time line;

to provide a second collection of N2 visually perceptible icons representing N2 configurations numbered n2=1 ..., N2 (N2≧2), associated with the project where the second collection comprises N2 icons from a group including: a first icon of the second collection representing a budget for at least a portion of the project; a second icon of the second collection representing an agreement or contract associated with the project; a third icon of the second collection representing a collection of at least one document associated with the project; a fourth icon of the second collection representing a metric associated with the project; a fifth icon of the second collection representing an organization associated with the project; a sixth icon of the second collection representing a policy associated with the project; a seventh icon of the second collection representing one or more requirements associated with the project; an eighth icon of the second collection representing at least one risk associated with the project; a ninth icon of the second collection representing at least one model or simulation parameter or associated with the project; a tenth icon of the second collection representing at least one result or prediction of a simulation associated with the project; an eleventh icon of the second collection of the second collection representing at least one strategy or plan associated with the project; a twelfth icon of the second collection representing at least one value associated with the project; a thirteenth icon of the second collection representing at least one goal associated with the project; a fourteenth icon of the second collection representing at least one procedure associated with the project; a fifteenth icon of the second collection representing at least one roadmap associated with the project; a sixteenth icon of the second collection representing at least one milestone or schedule associated with the project; a seventeenth icon of the second collection representing at least one estimate associated with the project; an eighteenth icon of the second collection representing at least one option associated with the project; a nineteenth icon of the second collection representing at least one mitigation action available that is associated with the project; a twentieth icon of the second collection representing at least one facility associated with the project; a twenty-first icon of the second collection representing at least one person associated with the project; a twenty-second icon of the second collection representing at least one portfolio asset associated with the project;

to associate first and second configuration icons with selected time values, $t=t_{L3}$ and $t=t_{L4}$, respectively, along the time line, with $t_{L3} \leq t_{L4}$;

to provide a second connector line, oriented lateral to the first dimension, connecting the first and second configuration icons, when the first and second configuration icons have a time relationship relative to each other;

to provide a visually perceptible display of the second connector line and of the first and second configuration icons, at a second selected location along the time line;

to associate a third event icon and a third configuration icon, with selected time values, $t=t_{L5}$ and $t=t_{L6}$, respectively, along the time line, and to provide a third connector line, oriented lateral to the first dimension, connecting a third event icon and the third configuration icon, when the third event icon and the third configuration icon have a time relationship relative to each other; and to provide a visually perceptible display of the third connector line and of the third decision icon and the third configuration icon, at a third selected location along the time line.

2. The method of claim 1, further comprising programming said computer:

to provide, upon receipt of an event metadata activation signal associated with a selected event icon from among said N1 event icons, metadata information in a visually perceptible format in an under-layer associated with the selected event icon, on at least one event associated with the selected icon, including information on history of events associated with the selected icon, where the metadata information further includes: at least one of time and date associated with at least one event; time and date the selected icon was created and was last modified; author(s) of the selected icon; at least one of phone number and e-mail address for contact of one or more authors of the selected icon; a change log for the selected icon and the associated information change; one or more user reference links; location(s) of the at least one event; at least one person responsible for the at least one event; rationale for the at least one event; links from at least one other location to the selected icon; feedback links; and link statistics.

3. The method of claim 2, further comprising programming said computer:

to receive access control information on at least one user of said computer and to restrict or preclude activity by the user in at least one of viewing, reading, writing, deleting and editing of said selected event icon under-layer.

4. The method of claim 1, further comprising programming said computer:

to provide, upon receipt of a configuration metadata activation signal associated with a selected icon from among said N2 configuration icons, configuration metadata information in a visually perceptible format in an under-layer associated with the selected configuration icon, on at least one configuration associated with the selected icon, including information on history of decisions associated with the selected icon, where the metadata information further includes at least one of: time and date of creation and of last modification of the at least one configuration; summary of configuration; at least one author of the configuration; at least one of phone number and e-mail address for contact of one or more authors of the configuration; at least one subscriber; at least one comment on configuration by said at least one user; recommended action on configuration and rationale; at least one option for routing a configuration; and description of present version of the configuration.

5. The method of claim 4, further comprising programming said computer:

to receive access control information on at least one user of said computer and to restrict or preclude user activity in at least one of viewing, reading, writing, deleting and editing of said selected configuration icon under-layer.

6. The method of claim 1, further comprising programming said computer:

to provide a third collection of N3 visually perceptible icons representing N3 feedback mechanisms associated with decision processes, numbered n3=1 . . . N3 (N3≧2), where the third collection comprises N3 icons from a group including: a first note/tag icon from the third collection representing at least one unresolved question associated with said project; a second question icon of the third collection representing at least one portfolio asset associated with said project; a third icon of the third collection representing at least one unresolved question associated with said project; a fourth waste/inefficiency icon of the third collection representing at least one wasteful or inefficient procedure associated with said project; a fifth issue/warning icon of the third collection representing at least one warning concerning a dangerous procedure associated with said project; a sixth disconnect icon of the third collection representing at least one disconnect or inconsistent response associated with said project;

to associate first and second feedback icons, with selected time values, $t=t_{L5}$ and $t=t_{L6}$, respectively, along said time line, with $t_{L5} \leq t_{L6}$;

to provide a second connector line, oriented lateral to said first dimension, connecting the first and second feedback icons, when the first and second feedback icons have a time relationship relative to each other;

to provide a visually perceptible display of the second connector line and of the first and second feedback icons, at a second selected location along said time line;

to associate a third event icon and a third configuration icon, with selected time values, $t=t_{L7}$ and $t=t_{L8}$, respectively, along said time line, and to provide a third connector line, oriented lateral to said first dimension, connecting the third event icon and the third configuration icon, when the third event icon and the third configuration icon have a time relationship relative to each other; and to provide a visually perceptible display of the third connector line and of the third event icon and the third configuration icon, at a third selected location along said time line;

to associate a fourth event icon and a fourth feedback icon, with selected time values, $t=t_{L9}$ and $t=t_{L10}$, respectively, along said time line, and to provide a fourth connector line, oriented lateral to said first dimension, connecting the fourth event icon and the fourth feedback icon, when the fourth event icon and the fourth feedback icon have a time relationship relative to each other;

to provide a visually perceptible display of the fourth connector line and of the fourth event icon and the fourth feedback icon, at a fourth selected location along said time line;

to associate a fifth configuration icon and a fifth feedback icon, with selected time values, $t=t_{L11}$ and $t=t_{L12}$, respectively, along said time line, and to provide a fifth connector line, oriented lateral to said first dimension, connecting the fifth configuration icon and the fifth feedback icon, when the fifth configuration icon and the fifth feedback icon have a time relationship relative to each other; and to provide a visually perceptible display of the fifth connector line and of the fifth configuration icon and the fifth feedback icon, at a fifth selected location along said time line.

7. The method of claim 6, further comprising programming said computer:

to provide, upon receipt of a feedback metadata activation signal associated with a selected feedback icon from among said N3 feedback icons, feedback metadata information in a visually perceptible format in an under-layer associated with the selected feedback icon, on feedback associated with the selected icon, including information on history of feedback associated with the selected icon, where the metadata information includes at least one of: object type or class; time and date of feedback event; date and time the feedback event icon was created and was last modified; icon author(s); phone number and e-mail address for contact of one or more authors; subscribers; user comments; feedback target(s); recommended feedback actions and rationales; options for routing a feedback communication; feedback links and link statistics; and parent and child links.

8. The method of claim 7, further comprising programming said computer:

to receive access control information on a user of said computer and to restrict or preclude user activity in at least one of viewing, reading, writing, deleting and editing of said selected icon under-layer.

* * * * *